Figure 1:
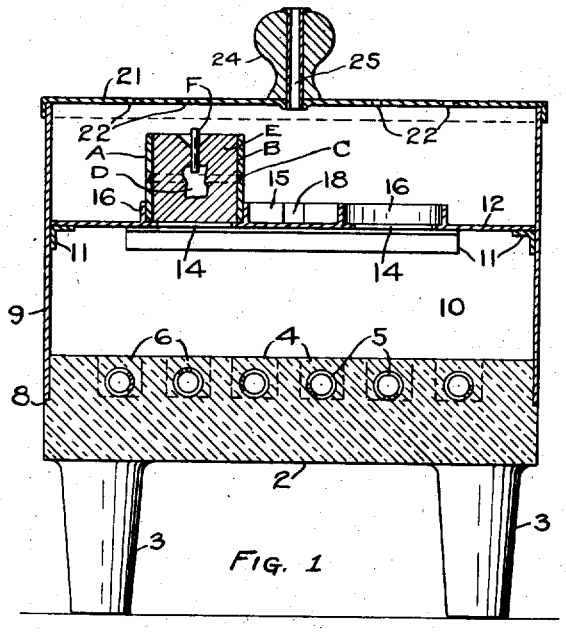

T. W. MAVES.

OVEN FOR BURNING OUT INVESTED MODELS.

APPLICATION FILED JULY 16, 1919.

Reissued Sept. 30, 1919. 14,730.

INVENTOR:
THEODORE W. MAVES.
BY Whitely & Fuchs
HIS ATTORNEYS.

UNITED STATES PATENT OFFICE.

THEODORE W. MAVES, OF MINNEAPOLIS, MINNESOTA.

OVEN FOR BURNING OUT INVESTED MODELS.

14,730. Specification of Reissued Letters Patent. Reissued Sept. 30, 1919.

Original No. 1,279,738, dated September 24, 1918, Serial No. 230,451, filed April 24, 1918. Application for reissue filed July 16, 1919. Serial No. 311,360.

*To all whom it may concern:*

Be it known that I, THEODORE W. MAVES, a citizen of the United States, residing at Minneapolis, in the county of Hennepin and State of Minnesota, have invented certain new and useful Improvements in Ovens for Burning Out Invested Models, of which the following is a specification.

My invention relates to heat distributing means or ovens for burning out invested models and has for its object to provide a mechanism wherein such invested models within the customary flask provided for holding the investment may be subjected to heat so regulated and controlled that the wax model will be burned out or caused to be absorbed by the investment material, thereby leaving a mold in place of the model into which gold or other filling material may be poured. In making dental castings it has been customary to provide a flask for the wax model or pattern of the shape of the cavity to be filled. This flask is of well-known form, as shown at A in Figure 6 and in section at B in Fig. 1, and comprises simply a cylinder open at both ends and ordinarily with a circumferential groove such as is indicated at C in Fig. 1 for preventing the investment material from slipping. In using this flask the model to form the desired casting is placed at or near the center of the space within the flask, as indicated at D in Fig. 1, and surrounded by what is known as "investment" material E, with a sprue rod F mounted in the wax model and extending outwardly through the investment material E. The investment material is of a well-known character which has the property of absorbing the wax when the same is subjected to the requisite amount of heat. After such heating and after the wax has been entirely absorbed, the sprue rod F is removed and a matrix or mold is formed within the investment material of exactly the size and form of the original wax model with an opening thereinto produced by the withdrawal of the sprue rod, through which the molten metal passes into said model where it forms the desired casting or inlay.

The object of my present invention is to provide means for imparting heat in definite and regulated manner with the desired gradual increase in temperature so that the wax model may be melted and absorbed neatly and efficiently and so as not to produce any checking or flaking of the mold which would destroy the correctness of the casting.

The invention consists generally in various constructions and combinations, as will more fully appear in connection with the detailed description thereof, and the novel features of which are particularly pointed out in the claims.

Figure 6:
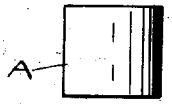
Figure 4:
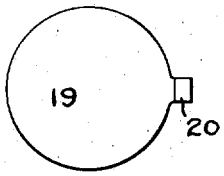
Figure 5:
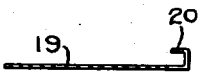
Figure 2:
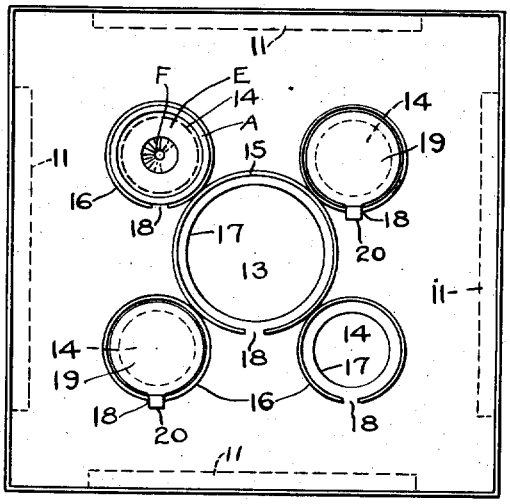
Figure 3:
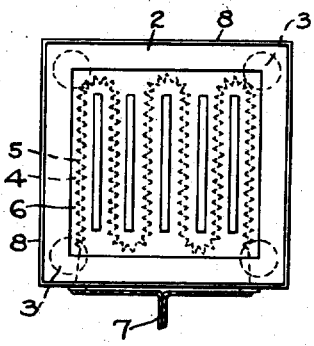

In the accompanying drawings forming part of this specification,

Fig. 1 is a vertical sectional view through an oven embodying my invention with a flask shown in position thereon and having represented therein an invested model and sprue rod. Fig. 2 is a plan view with the cover removed showing the support for the flasks above the heater. Fig. 3 is a plan view of the heater proper. Figs. 4 and 5 are detail views of the covers which may be used for closing holes for the flasks. Fig. 6 is a side view of a flask.

As illustrated herein 2 represents the base of the heater, having suitable supporting legs 3 and provided in its upper surface with a series of transverse grooves or recesses 4 in which a resistance coil 5 is placed and embedded in a suitable plastic material 6, which forms the upper heat-radiating surface of the base 2. The ends of the coil are in circuit with an electric conductor 7 through which a current is passed to heat the resistance wire 5 and the space above the heater forming the oven. The resistance coil is so made or formed that when the current is turned on the oven will be heated to a certain temperature which I have found best suited for melting the wax, and by equipping the heater with a coil, for producing a certain degree of temperature I am able to determine how long the flask should be in the oven to melt the model.

The base or bed of the heater has a recess or shoulder formed therein at 8 whereon a casing 9 is seated. This casing is made preferably of metal rectangular in form to fit snugly down on to the top of the base to form, with the cover hereinafter described, a heating chamber for the oven 10 above the base. Ledges 11, preferably of angle bar, are secured to the casing 9, preferably near the middle point between the top and bottom of the casing, and said ledges form side supports for a flask-supporting member 12 that is seated loosely on the ledges 11 and extends across the chamber 10 formed above the base 2. This plate 12 is provided with a comparatively large central opening 13 and a series of smaller openings 14 arranged around it, and I preferably provide flanges 15 and 16 encircling these openings and spaces from the edges thereof to form ribs or ledges 17. The flanges 15 and 16 have openings 18 therein, and cover-plates 19 fit within the flanges by which the openings in the plate 12 may, if desired, be closed, finger grips 20 on the cover-plate 19 which project through the openings 18 providing ready means for applying and withdrawing such cover plates. Some or all of the openings not occupied by the flasks may be closed by the cover-plates to prevent undue circulation of heated air from the lower part to the upper part of the chamber 10, but, as shown in Fig. 2, it is generally not desirable to close off all of the openings when a flask is in the oven, as some circulation of air from the lower to the upper part of the oven chamber is desirable.

By providing openings of different sizes in the plate 12 and flange members 15, 16 surrounding such openings of correspondingly varied sizes, I adapt the oven for flasks of different diameters, according to the size of the casting required. As clearly shown in Fig. 1, the flask A (shown in section at B) rests upon the ledges 17 formed inside of the flanges 15 or 16 with the bottom of said flask immediately above a hole 14 or 13 and directly exposed to the heat from the heater below. This exposed portion of the investment material at the bottom of the flask will be sufficiently near the heat-radiating surface of the base so that the invested material will absorb the radiated heat therefrom gradually and as rapidly as is desirable to produce absorption of the wax model so as to form a perfect mold.

The top of the casing is closed by a cover plate 21 having a series of vent holes 22 therein, one above each opening, and a hand grip 24 which has a central vent opening 25. By this means the oven chamber 10 is closed but at the same time permits some circulation of air through such of the openings 13 or 14 as are not closed and around the flasks seated loosely upon the ledges within the flanges 15 and 16, and thence through the cover openings 22 and 25. When the cover plate 21 is removed access may be had to the supporting member 12 and the flasks thereon. This member is shown as preferably supported about midway between the top and bottom of the casing, so that there will be ample room above the supporting member for the tops of the flasks and for the sprue rods therein.

With this apparatus one or more flasks may be heated simultaneously and the wax models or patterns easily and quickly melted and absorbed, leaving a matrix or mold in each flask in which the casting or inlay may be formed.

The flask-supporting member must be a certain predetermined distance from the heater to obtain the best results, but not too near or the investment material at the bottom of the flask exposed directly to the heat radiation from the heater may absorb heat too rapidly so that the wax will be burned out or melted too quickly. On the other hand, if the investment material is supported too far away the wax will be melted and absorbed too slowly and too inefficiently to obtain a finely finished casting. A degree of heat that is too low or that is fluctuating so as not to uniformly melt the wax will be fatal to the successful operation of the device, for if the melting is not uniformly obtained the casting will not be smooth and will not be a duplicate of the wax pattern and hence will not fit the tooth. For this reason it is desirable to have some circulation of air, as hereinbefore pointed out, so that the upper part of the flask may absorb heat some through the sides and top at the same time that the investment material at the bottom of the flask is subjected to the direct radiation from the heater.

Also, overheating will cause the investment to crack and produce a defective casting. The best results are provided by obtaining a slow, gradual heating of the oven and the walls of the flask therein, and particularly the exposed surface of investment material within the flask, and by making provision for this slow, gradual heating as hereinbefore pointed out, I am able to produce a mold or matrix in which a smooth, accurately formed casting will be formed which will be an exact duplicate of the wax model and be a perfect fit for the cavity or tooth from which said model was made.

The device may be made in various sizes and the oven may be modified in various ways and still be within the scope of my invention.

I claim as my invention:

1. An apparatus of the class described comprising a base having a heating means mounted therein, a casing mounted on said base and forming a heating chamber, and a flask-supporting means arranged within said casing and spaced from said heating means, said supporting means holding the flask and the investment material therein at a predetermined distance from the heating means.

2. An apparatus of the class described comprising a base having a heating means mounted therein, a casing mounted on said base and forming a heating chamber, and a flask-supporting means arranged within said casing and spaced from said heating means, said supporting means being formed with open portions above which the flask is supported with the investment material therein exposed through said open portions to the direct radiation of heat from the heating means.

3. An apparatus of the class described comprising a base, heating means associated with said base to radiate heat directly from the upper surface of the base, a casing mounted on said base to form a heating chamber above the base, and a flask-supporting means arranged within said casing and spaced from the heat radiating surface of said base.

4. The combination, with a base having an electric heating coil mounted therein, of a casing surmounting said base to form a heating chamber, and a plate supported within said casing intermediate to the top and bottom thereof and having a plurality of openings therein, said plate forming a support for flasks for making dental castings so that the investment material within said flasks will be exposed through said openings to the direct radiation of heat from said heating coil.

5. An apparatus of the class described comprising a base, heating means associated with said base to radiate heat directly from the upper surface of the base, a casing mounted on said base to form a heating chamber above the base, and a perforated flask-supporting means arranged within said casing and spaced from the heat radiating surfaces of said base so as to support flasks for making dental castings so that the investment material within said flasks will be exposed to the direct radiation of heat from said radiating surface.

6. An apparatus of the class described comprising a base, heating means associated with said base to radiate heat directly from the upper surface of the base, a casing mounted on said base to form a heating chamber above the base, a flask-supporting means arranged within said casing and spaced from the heat radiating surface of said base, and means for permitting circulation of air within said chamber and through said flash-supporting means.

7. An apparatus of the class described comprising a base, heating means associated with said base to radiate heat directly from the upper surface of the base, a casing mounted on said base to form a heating chamber above the base, a removable cover for said casing, and a flask-supporting means arranged within said casing between the cover and the heat radiating surface of said base.

8. An apparatus of the class described comprising a base, heating means associated with said base to radiate heat directly from the upper surface of the base, a casing mounted on said base to form a heating chamber above the base, a removable cover for said casing, and a flask-supporting plate arranged within said casing between the cover and the heat radiating surface, said plate having a plurality of holes therein and flanges encircling said holes and spaced from the edges of said openings to provide ledges for receiving the edges of the flasks so as to expose the investment material therein to direct radiation of heat from said radiating surface.

9. An apparatus of the class described comprising a base, heating means associated with said base to radiate heat directly from the upper surface of the base, a casing mounted on said base to form a heating chamber above the base, a removable cover for said casing, and a flask-supporting plate arranged within said casing between the cover and the heat radiating surface of said base, said plate having a plurality of holes therein for receiving a plurality of flasks with the investment material therein exposed to the direct radiation of heat from said radiating surface, and cover plates adapted to close any of said holes.

10. An apparatus of the class described comprising a base having an electric heater therein for producing a predetermined degree of heat, a casing supported by said base to form a heating chamber, a flask carrier within said casing and spaced from said heater, said carrier having an opening therein, and means associated with the opening to receive a flask containing a wax model and investment material and hold said flask so that the investment material will be exposed to the direct radiation of heat from said heater and be heated by the predetermined degree of heat produced thereby to cause said model to be melted and absorbed by the investment material.

11. An apparatus of the class described comprising a base, heating means associated with said base to radiate heat directly from the upper surface of the base, a casing mounted on said base to form a heating chamber above the base, a flask carrier arranged within said casing and spaced from said radiating surface, and a flask mounted on said carrier within the heating chamber, said heating means being constructed to provide a gradual uniform heat in said chamber around the walls of the flask supported upon the carrier.

12. An apparatus of the class described comprising a base having an electric heating coil mounted therein for producing a predetermined degree of heat, a casing surmounting said base to form a heating chamber, a flask carrier supported within said casing and spaced from said heater, said carrier having a comparatively large central opening therein and a series of smaller openings encircling said central opening, and means surrounding all said openings to receive and support flasks containing an investment material and wax models and to hold said flasks so that the investment material will be exposed to the direct radiation of heat from said heater and will be heated uniformly within the chamber to cause the wax models to be melted and absorbed by the investment material within a predetermined time.

13. An apparatus of the class described comprising a base, heating means associated with said base to radiate heat directly from the upper surface of the base, a casing mounted on said base to form a heating chamber above the base, a perforated flask-supporting means arranged within said casing and spaced from the heat radiating surface of said base, and a flask containing a wax model and investment material mounted on said perforate flask-supporting means within the heating chamber.

In testimony whereof I have hereunto affixed my signature.

THEODORE W. MAVES.

Copies of this patent may be obtained for five cents each, by addressing the "Commissioner of Patents, Washington, D. C."